US008417770B2

United States Patent
Vange et al.

(10) Patent No.: US 8,417,770 B2
(45) Date of Patent: *Apr. 9, 2013

(54) DATA REDIRECTION SYSTEM AND METHOD THEREFOR

(75) Inventors: Mark Vange, Toronto (CA); Marc Plumb, Toronto (CA); Michael Kouts, Toronto (CA); Glenn Sydney Wilson, Toronto (CA)

(73) Assignee: Circadence Corporation, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/162,366

(22) Filed: Jun. 16, 2011

(65) Prior Publication Data

US 2011/0302321 A1    Dec. 8, 2011

Related U.S. Application Data

(60) Continuation of application No. 11/346,767, filed on Feb. 3, 2006, now Pat. No. 7,975,066, which is a division of application No. 09/835,876, filed on Apr. 16, 2001, now Pat. No. 7,127,518.

(60) Provisional application No. 60/197,490, filed on Apr. 17, 2000.

(51) Int. Cl.
*G06F 15/16*    (2006.01)
(52) U.S. Cl.
USPC ............ 709/203; 709/219; 709/224; 709/240
(58) Field of Classification Search .................. 709/203, 709/217–219, 224, 240
See application file for complete search history.

(56) References Cited

U.S. PATENT DOCUMENTS 5,130,982 A    7/1992    Ash et al.
(Continued)

FOREIGN PATENT DOCUMENTS

EP    0384339    8/1990
EP    0774878    8/1997
(Continued)

OTHER PUBLICATIONS

K Sriram, "Methodologies for bandwidth allocation, transmission scheduling, and congestion avoidance in broadband ATM networks", Computer Networks and ISDN Systems, 26 (1993) pp. 43-59.

(Continued)

*Primary Examiner* — David Lazaro
(74) *Attorney, Agent, or Firm* — Weide & Miller, Ltd.

(57) ABSTRACT

A data redirection system and method comprises a first and second redirector in one or more embodiments. The first redirector may receive and respond to requests for a network service by redirecting a client's request to the second redirector. The second redirector may receive and respond to the redirected request by sending a network address of a gateway. The gateway may provide an enhanced communication link with a network resource providing the network service. In this manner, communications used to provide the network service may be redirected to the enhanced communication link. The requests for a network service and responses to the requests will typically be communicated over a standard communication link.

13 Claims, 8 Drawing Sheets

U.S. PATENT DOCUMENTS

| | | |
|---|---|---|
| 5,258,983 A | 11/1993 | Lane et al. |
| 5,548,646 A | 8/1996 | Aziz et al. |
| 5,673,322 A | 9/1997 | Pepe et al. |
| 5,742,772 A | 4/1998 | Sreenan |
| 5,757,771 A | 5/1998 | Li et al. |
| 5,805,203 A | 9/1998 | Horton |
| 5,933,412 A | 8/1999 | Choudhury et al. |
| 5,951,694 A | 9/1999 | Choquier et al. |
| 5,956,330 A | 9/1999 | Kerns |
| 5,999,971 A | 12/1999 | Buckland |
| 6,006,264 A | 12/1999 | Colby et al. |
| 6,023,456 A | 2/2000 | Chapman et al. |
| 6,034,964 A | 3/2000 | Fukushima et al. |
| 6,070,192 A | 5/2000 | Holt et al. |
| 6,078,582 A | 6/2000 | Curry et al. |
| 6,081,900 A | 6/2000 | Subramaniam et al. |
| 6,167,449 A | 12/2000 | Arnold et al. |
| 6,226,680 B1 | 5/2001 | Boucher et al. |
| 6,247,060 B1 | 6/2001 | Boucher et al. |
| 6,272,492 B1 | 8/2001 | Kay |
| 6,310,894 B1 | 10/2001 | Counterman |
| 6,334,153 B2 | 12/2001 | Boucher et al. |
| 6,336,137 B1 | 1/2002 | Lee et al. |
| 6,366,947 B1 | 4/2002 | Kavner |
| 6,381,228 B1 | 4/2002 | Prieto et al. |
| 6,389,479 B1 | 5/2002 | Boucher et al. |
| 6,393,487 B2 | 5/2002 | Boucher et al. |
| 6,427,171 B1 | 7/2002 | Craft et al. |
| 6,427,173 B1 | 7/2002 | Boucher et al. |
| 6,434,620 B1 | 8/2002 | Boucher et al. |
| 6,470,415 B1 | 10/2002 | Starr et al. |
| 6,591,288 B1 | 7/2003 | Edwards et al. |
| 6,591,302 B2 | 7/2003 | Boucher et al. |
| 6,640,248 B1 | 10/2003 | Jorgensen |
| 6,657,957 B1 | 12/2003 | Cheung et al. |
| 6,658,480 B2 | 12/2003 | Boucher et al. |
| 6,687,758 B2 | 2/2004 | Craft et al. |
| 6,697,868 B2 | 2/2004 | Craft et al. |
| 6,728,208 B1 | 4/2004 | Puuskari |
| 6,751,665 B2 | 6/2004 | Philbrick et al. |
| 6,757,746 B2 | 6/2004 | Boucher et al. |
| 6,760,308 B1 | 7/2004 | Ghanma et al. |
| 6,760,336 B1 | 7/2004 | Mangin et al. |
| 6,807,581 B1 | 10/2004 | Starr et al. |
| 6,816,456 B1 | 11/2004 | Tse-Au |
| 6,820,133 B1 | 11/2004 | Grove et al. |
| 6,836,795 B2 | 12/2004 | Soderberg et al. |
| 6,879,526 B2 | 4/2005 | Lynch et al. |
| 6,938,092 B2 | 8/2005 | Burns |
| 6,941,386 B2 | 9/2005 | Craft et al. |
| 6,965,941 B2 | 11/2005 | Boucher et al. |
| 6,996,070 B2 | 2/2006 | Starr et al. |
| 6,999,471 B1 | 2/2006 | Frazer et al. |
| 7,020,719 B1 | 3/2006 | Grove et al. |
| 7,042,898 B2 | 5/2006 | Blightman et al. |
| 7,076,568 B2 | 7/2006 | Philbrick et al. |
| 7,082,467 B2 | 7/2006 | Border et al. |
| 7,085,247 B2 | 8/2006 | Schweinhart et al. |
| 7,089,326 B2 | 8/2006 | Boucher et al. |
| 7,093,099 B2 | 8/2006 | Bodas et al. |
| 7,116,936 B2 | 10/2006 | Kim |
| 7,120,666 B2 | 10/2006 | McCanne et al. |
| 7,124,205 B2 | 10/2006 | Craft et al. |
| 7,133,361 B2 | 11/2006 | Olariu et al. |
| 7,133,940 B2 | 11/2006 | Blightman et al. |
| 7,164,661 B2 | 1/2007 | Kelly |
| 7,167,926 B1 | 1/2007 | Boucher et al. |
| 7,167,927 B2 | 1/2007 | Philbrick et al. |
| 7,170,889 B2 | 1/2007 | Eagling et al. |
| 7,174,393 B2 | 2/2007 | Boucher et al. |
| 7,185,266 B2 | 2/2007 | Blightman et al. |
| 7,191,241 B2 | 3/2007 | Boucher et al. |
| 7,191,318 B2 | 3/2007 | Tripathy et al. |
| 7,213,077 B2 | 5/2007 | Border |
| 7,219,158 B2 | 5/2007 | Border et al. |
| 7,237,036 B2 | 6/2007 | Boucher et al. |
| 7,245,405 B2 | 7/2007 | Friedman et al. |
| 7,245,930 B1 | 7/2007 | Vishwanath et al. |
| 7,254,696 B2 | 8/2007 | Mittal et al. |
| 7,284,070 B2 | 10/2007 | Boucher et al. |
| 7,313,035 B2 | 12/2007 | Lynch et al. |
| 7,336,967 B2 | 2/2008 | Kelly et al. |
| 7,337,233 B2 | 2/2008 | Dillon |
| 7,337,241 B2 | 2/2008 | Boucher et al. |
| 7,359,985 B2 | 4/2008 | Grove et al. |
| 7,370,116 B2 | 5/2008 | Chan et al. |
| 7,386,310 B2 | 6/2008 | Dai et al. |
| 7,388,869 B2 | 6/2008 | Butehorn et al. |
| 7,389,330 B2 | 6/2008 | Dillon et al. |
| 7,389,533 B2 | 6/2008 | Bartlett et al. |
| 7,392,325 B2 | 6/2008 | Grove et al. |
| 7,398,552 B2 | 7/2008 | Pardee et al. |
| 7,418,518 B2 | 8/2008 | Grove et al. |
| 2001/0021949 A1 | 9/2001 | Blightman et al. |
| 2001/0023460 A1 | 9/2001 | Boucher et al. |
| 2001/0027496 A1 | 10/2001 | Boucher et al. |
| 2001/0043609 A1 | 11/2001 | Chapman et al. |
| 2001/0047433 A1 | 11/2001 | Boucher et al. |
| 2001/0049741 A1* | 12/2001 | Skene et al. ............ 709/232 |
| 2002/0087732 A1 | 7/2002 | Boucher et al. |
| 2002/0091844 A1 | 7/2002 | Craft et al. |
| 2002/0095519 A1 | 7/2002 | Philbrick et al. |
| 2002/0103881 A1 | 8/2002 | Granade et al. |
| 2002/0129159 A1 | 9/2002 | Luby et al. |
| 2002/0136240 A1 | 9/2002 | Counterman |
| 2002/0156927 A1 | 10/2002 | Boucher et al. |
| 2003/0079033 A1 | 4/2003 | Craft et al. |
| 2003/0140124 A1 | 7/2003 | Burns |
| 2003/0147403 A1 | 8/2003 | Border et al. |
| 2003/0167346 A1 | 9/2003 | Craft et al. |
| 2003/0172264 A1 | 9/2003 | Dillon |
| 2003/0177395 A1 | 9/2003 | Pardee et al. |
| 2003/0177396 A1 | 9/2003 | Bartlett et al. |
| 2003/0200284 A1 | 10/2003 | Philbrick et al. |
| 2003/0219022 A1 | 11/2003 | Dillon et al. |
| 2004/0003126 A1 | 1/2004 | Boucher et al. |
| 2004/0010612 A1 | 1/2004 | Pandya |
| 2004/0054813 A1 | 3/2004 | Boucher et al. |
| 2004/0062246 A1 | 4/2004 | Boucher et al. |
| 2004/0064578 A1 | 4/2004 | Boucher et al. |
| 2004/0064589 A1 | 4/2004 | Boucher et al. |
| 2004/0064590 A1 | 4/2004 | Starr et al. |
| 2004/0073703 A1 | 4/2004 | Boucher et al. |
| 2004/0088262 A1 | 5/2004 | Boucher et al. |
| 2004/0117509 A1 | 6/2004 | Craft et al. |
| 2004/0158793 A1 | 8/2004 | Blightman et al. |
| 2004/0240435 A1 | 12/2004 | Boucher et al. |
| 2005/0122986 A1 | 6/2005 | Starr et al. |
| 2005/0182841 A1 | 8/2005 | Sharp |
| 2006/0010238 A1 | 1/2006 | Craft et al. |
| 2006/0129697 A1 | 6/2006 | Vange et al. |
| 2006/0159098 A1 | 7/2006 | Munson et al. |
| 2006/0168281 A1 | 7/2006 | Starr et al. |
| 2007/0022185 A1 | 1/2007 | Hamilton et al. |
| 2007/0110046 A1 | 5/2007 | Farrell et al. |
| 2007/0130356 A1 | 6/2007 | Boucher et al. |
| 2007/0223379 A1 | 9/2007 | Sivakumar et al. |
| 2007/0223481 A1 | 9/2007 | Sivakumar et al. |
| 2008/0022073 A1 | 1/2008 | Mittal et al. |
| 2008/0040519 A1 | 2/2008 | Starr et al. |
| 2008/0062879 A1 | 3/2008 | Sivakumar et al. |
| 2008/0126553 A1 | 5/2008 | Boucher et al. |
| 2008/0151917 A1 | 6/2008 | Bartlett et al. |
| 2008/0238730 A1 | 10/2008 | Eroz et al. |
| 2009/0006920 A1 | 1/2009 | Munson et al. |
| 2009/0063698 A1 | 3/2009 | Xu et al. |

FOREIGN PATENT DOCUMENTS

| | | |
|---|---|---|
| EP | 0794491 | 9/1997 |
| EP | 0828214 | 3/1998 |
| EP | 0942363 | 9/1999 |
| EP | 1333642 | 8/2003 |
| EP | 1443713 | 8/2004 |
| EP | 1443730 | 8/2004 |
| EP | 1443731 | 8/2004 |
| EP | 1443732 | 8/2004 |
| GB | 2309558 | 7/1997 |

| | | |
|---|---|---|
| WO | WO 97/29424 | 8/1997 |
| WO | WO 97/30392 | 8/1997 |
| WO | WO 98/26553 | 6/1998 |
| WO | WO 98/28938 | 7/1998 |
| WO | WO 99/09689 | 2/1999 |
| WO | WO 99/18534 | 4/1999 |
| WO | WO 99/57620 | 11/1999 |
| WO | WO 99/57637 | 11/1999 |
| WO | WO 03/104943 | 12/2003 |
| WO | WO 2008/067597 | 6/2008 |

OTHER PUBLICATIONS

V. Kumar, et al., "Beyond Best Effort: Reouter Architectures for the Differentiated Services of Tomorrow's Internet", May 1998, IEEE Communications Magazine, pp. 152-164.

R.M. Adler, "Distributed Coordination Models for Client/Server Computing", Apr. 1995, IEEE Computer, pp. 14-22.

G. C. Lai, et al., "Support QoS in IP over ATM", Computer Communications, 22 (1999) pp. 411-418.

* cited by examiner

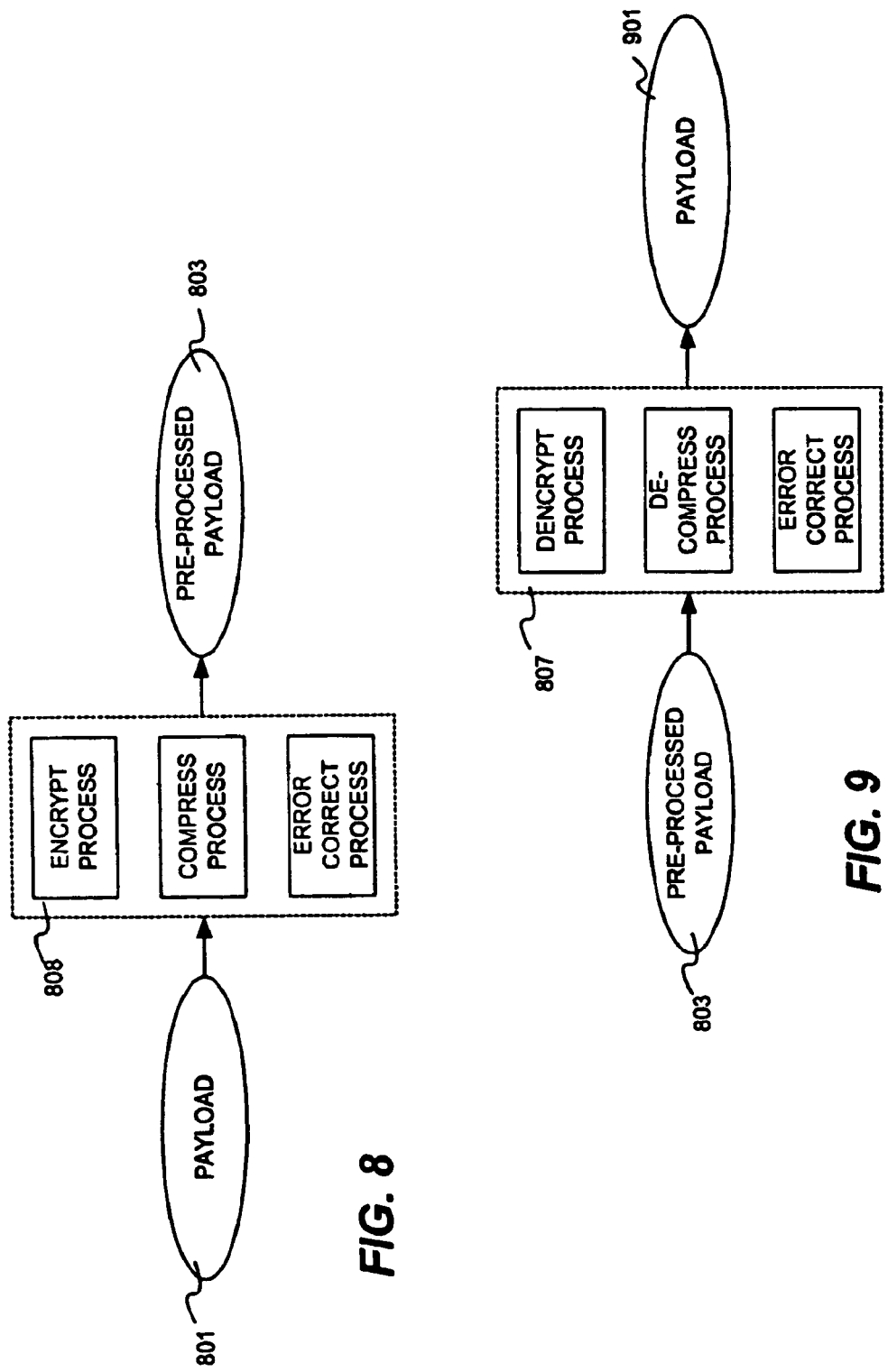

DATA REDIRECTION SYSTEM AND METHOD THEREFOR

CROSS-REFERENCE TO RELATED APPLICATION

The present invention is a continuation of U.S. patent application Ser. No. 11/346,767, filed Feb. 3, 2006, now U.S. Pat. No. 7,975,066 which is a divisional of U.S. patent application Ser. No. 09/835,876, filed Apr. 16, 2001, now U.S. Pat. No. 7,127,518 which claims priority from U.S. Provisional Patent Application No. 60/197,490, filed Apr. 17, 2000.

BACKGROUND OF THE INVENTION

1. Field of the Invention

The present invention relates, in general, to network communications, and, more particularly, to software, systems end methods for implementing enhanced data communications.

2. Relevant Background

Increasingly, business data processing systems, entertainment systems, and personal communications systems are implemented by computers across networks that are interconnected by internetworks (e.g., the Internet). The Internet is rapidly emerging as the preferred system for distributing and exchanging data. Data exchanges support applications including electronic commerce, broadcast and multicast messaging, videoconferencing, gaming, and the like.

The Internet is a collection of disparate computers and networks coupled together by a web of interconnections using standardized communications protocols. The Internet is characterized by its vast reach am a result of its wide and increasing availability and easy access protocols. Unfortunately, the ubiquitous nature of the Internet results in variable bandwidth and quality of service between points. The latency and reliability of data transport is largely determined by the total amount of traffic on the Internet and so varies wildly seasonally and throughout the day. Other factors that affect quality of service include equipment outages and line degradation that force packets to be rerouted, damaged and/or dropped. Also, routing software and hardware limitations within the Internet infrastructure may create bandwidth bottlenecks even when the mechanisms are operating within specifications.

Internet transport protocols do not discriminate between users. Data packets are passed between routers and switches that make up the Internet fabric based on the hardware's instantaneous view of the best path between source and destination nodes specified in the packet. Because each packet may take a different path, the latency of a packet cannot be guaranteed and in practice varies significantly. Likewise, data packets are routed through the Internet without any prioritization based on content.

Prioritization has not been an issue with conventional networks such as local area networks (LANs) and wide area networks (WANs) because the average latency of such networks has been sufficiently low and sufficiently uniform to provide acceptable performance. However, there is en increasing demand for network applications that cannot tolerate high and variable latency. This situation is complicated when the application is to be run over the Internet where latency end variability in latency are many times greater than in LAN and WAN environments.

A particular need exists in environments that involve multiple users accessing a network resource such as a web server. Examples include broadcast, multicast and videoconferences as well as most electronic commerce (e-commerce) applications. In these applications it is important to maintain a reliable connection so that the server and clients remain synchronized end information is not lost.

In e-commerce applications it is important to provide a satisfying buyer experience that leads to a purchase transaction. To provide this high level of service, a web site operator must ensure that data is delivered to the customer in the most usable and efficient fashion. Also, the web site operator must ensure that critical data received from the customer is handled with priority.

While efforts are continually being made to increase the capacity and quality of service afforded by the Internet, it is contemplated that congestion will always impact the ability to predictably and reliably offer a specified level of service. A need exists for a system to exchange data over the Internet that provides a high quality of service even during periods of congestion.

SUMMARY OF THE INVENTION

The data redirection system provides automated redirection of data from standard communication links to enhanced communication links without the need for end-user intervention. The enhanced communication links provide improved bandwidth and latency, among other things, to improve communication between a data source and destination, such as a network resource or server and a client. The redirection system is capable of selecting one of the enhanced communication links to which a client may be redirected based on various criteria. The data redirection system may be configured in various ways.

For example, in one embodiment a system for redirecting a client to a remote server via an enhanced communications channel may comprise a gateway configured to provide access to said remote server via at least one enhanced channel, and one or more enhanced channels between the gateway and the remote server. A first redirector may be configured to respond to the client by redirecting the client to the gateway. A second redirector may be configured to receive a request from the client through a non-enhanced communications channel and to redirect the request to the first redirector. The remote server may be located in a first local area network and the gateway may be located within a remote second local area network. The non-enhanced communications channel may be an Internet standard communications channel, while the enhanced communications channel may not be an Internet standard communications channel.

It is noted that one or more additional gateways may be provided and the first redirector may be configured to select a gateway from the plurality of gateways and to respond to the client by redirecting the client to the selected gateway. The first redirector may be configured to select a gateway from the plurality of gateways based on a quality of service metric for at least one enhanced communications channel provided by each of the plurality of gateways. Alternatively or in addition, the first redirector may be configured to select a gateway from the plurality of gateways based on a relative distance between each of the plurality of gateways and a location of the client. The first redirector may be configured to respond to the client by redirecting the client to a secure port address of the gateway.

In another exemplary embodiment, a data redirection system may comprise at least one first redirector storing one or more network addresses of each of a plurality of gateways associated with one or more URLs. The at least one first redirector may be configured to respond with at least one of the one or more network addresses in response to a request for a URL. At least one second redirector in communication with the at least one first redirector may be included in the system as well. The at least one second redirector may be configured to change the one or more network addresses stored by the at least one first redirector to direct one or more requests for the URL to a network address of one of the plurality of gateways. In addition, one or more communications channels provided the plurality of gateways may be included.

The one or more communications channels may be configured to allow communication with a network device providing services for the URL. The one or more communications channels provided by the plurality of gateways may be enhanced communications channels utilizing a non-standard Internet protocol for communication.

The first redirector may be configured to respond with at least one of the one or more network addresses in response to the request for the URL through a standard non-enhanced communication link. The at least one second redirector may be configured to select a gateway from the plurality of gateways based on a quality of service metric for at least one of the one or more communications channels provided by each of the plurality of gateways, based on a relative distance between each of the plurality of gateways and a location of one or more clients, or based on an identification of the type of client application requesting the URL. The at least one second redirector may change the one or more network addresses stored by the at least one first redirector to direct one or more requests for the URL to the selected gateway.

It is noted that the data redirection system may further comprise at least one third redirector storing one or more IP addresses of the at least one first redirector to the URL. The at least one third redirector may be configured to respond with at least one of the one or more network addresses of the at least one first redirector in response to a request for the URL.

Various methods for redirecting data are also provided herein. For example, in one embodiment a method for redirecting data may comprise receiving at a first redirector a first request for network services through a first communication link, the network services provided by a network device, sending from the first redirector a network address of a second redirector in response to the first request for the network services, and selecting a second communication link from a plurality of second communication links that support communication with the network device. The second communication link may be selected based on a relative quality of service metric for the plurality of second communication links. It is noted that the second communication link may be provided by a gateway. The gateway may be within a first local area network and the network resource is within a second local area network remote from the first local area network.

A second request, requesting the same network services as the first request, may be received at the second redirector. A network address of the gateway may be sent from the second redirector in response to the second request for the network services, and the network services may be provided by transferring data through the selected second communication link. Sending the network address of the gateway in response to the second request may comprise responding with a secure port address of the gateway.

A domain name server may be provided as part of the method. The first request may then be received by the first redirector mechanism at the domain name server. It is noted that the first redirector may be installed on the network device such that the first request may be received by the first redirector mechanism at the network device.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 8 is a block diagram illustrating exemplary pre-processing processes; and

FIG. 9 is a block diagram illustrating exemplary post-processing processes.

DETAILED DESCRIPTION OF THE PREFERRED EMBODIMENTS

Figure 1:
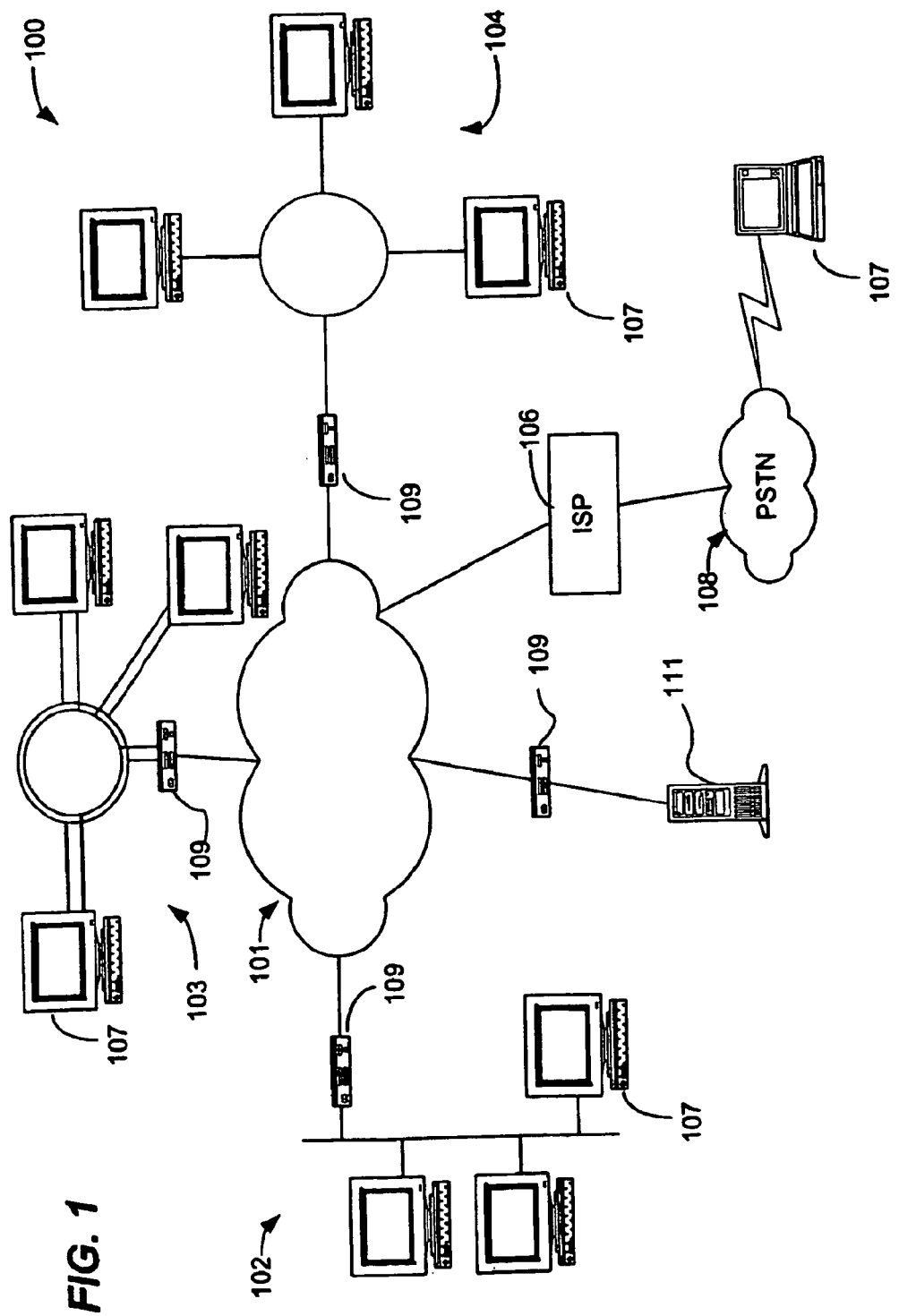
FIG. 1 is a block diagram illustrating a general distributed computing environment in which the present invention may be implemented.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In one aspect, the present invention involves a system for multiplexing data from a plurality of links or channels onto a shared bandwidth channel. The plurality of links may be fixed-bandwidth links, or may themselves be shared bandwidth links. The plurality of links may comprise a homogenous user-level protocol, such as HTTP, or may comprise a variety of user level protocols such as HTTP, FTP, NNTP, SMTP and the like. The plurality of links may similarly comprise homogenous network-layer and/or physical layer protocols, or may comprise a varied set of network-layer and physical layer protocols.

The shared bandwidth channel allows a variety of services to be provided. Some advantages are achieved simply by multiplexing multiple links onto a single channel. This combination enables the single channel to be persistent thereby avoiding overhead associated with setting up, maintaining and breaking down connections that would otherwise be required of each the multiple links. The single shared channel can also include more information than the protocols of the plurality of links allow such as time synchronization information and quality of service information.

In a particular embodiment, the shared bandwidth channel transports packets that are composed by selecting data from the plurality of links in an order and rate determined to provide differential levels of service or prioritization between packets. The differential service levels may mean that some of the data are transported with lower latency and/or higher quality of service than other data. The criteria for providing differential levels of service is not limited, but in particular embodiments is based on content type, user identity, user history, and session statistics.

The present inventions involve improvements to communication channels implemented through a public network such as the Internet. These improvements may be enabled by using front-end and back-end servers, typically implemented as web servers, that are located within the network. It is difficult to define a clear demarcation point for what mechanisms are "in the network" in contrast with mechanisms "outside of the network". Typically, devices outside the network, such as clients and servers, establish a channel through the network with each other. Using the OSI network model referenced above, all of the software and hardware mechanisms below the "network" protocol layer in the OSI model in the client and server computers can be considered within the network. Similarly processes and mechanisms that operate above the network level in the client and server can be considered "outside the network".

Given the terminology framework above, certain features of the present invention involve implementing processes that provide higher-layer services within the network. For example, services typically associated with the "presentation layer" or "application layer" such as compression and encryption are implemented within the network. In accordance with the present invention, these higher-layer processes are implemented between machines within the network in a manner that is preferably transparent to the computers outside the network. In this manner, so long as a common semantic is defined for a pair or set of machines within the network, it is not necessary to modify clients, servers, or other infrastructure components such as routers to recognize the semantic used to provide these higher-layer functions.

One aspect of the present invention relates to the improved functionality and metrics available when cooperating front-end and back-end servers are used to transport data through the public network. This enables an enhanced communication channel in which both ends can be synchronized and so easily know when the other end performed specific operations such as datagram generation and transmission. Each side may then take actions based on the knowledge that was previously only available to the transmitting side. Other functionality includes compression of traffic between front-end and back-end using public or proprietary compression mechanisms that can be readily selected and optimized for the particular content data currently being transported. Similarly, encryption/decryption mechanisms can be employed between the front-end and back-end for enhanced security without impacting either a web server or web client that are principles of the transaction. Forward error correction can be used to reduce the quantity of traffic, improve latency, and/or increase speed of the transport between front-end and back-end components.

Another aspect of the present invention relates to performance and functionality improvements enabled by implementing the front-end and back-end computers as dynamically re-configurable elements. This enables multiple front-ends to connect with and service multiple back-ends and/or one or more web servers or web sites allowing one front-end to service multiple back-ends and by extension multiple web servers or web sites. Similarly, one front-end can service multiple web servers or content providers directly.

The present invention is illustrated and described in terms of a distributed computing environment such as an enterprise computing system using public communication channels such as the Internet. However, an important feature of the present invention is that it is readily scaled upwardly and downwardly to meet the needs of a particular application. Accordingly, unless specified to the contrary, the present invention is applicable to significantly larger, more complex network environments, including wireless network environments, as well as small network environments such as conventional LAN systems.

The present invention is particularly useful in applications where there is an large amount of data communicated between web servers and web clients (i.e., browser software) or where timeliness (e.g., low latency transport) is important. For example, real-time stock quotes, multi-player games, multi-tiered service to ASP (application service provider) software distribution models benefit from the improvements provided by the present invention. Although the present invention will be described in terms of particular applications, these examples are provided to enhance understanding and are not a limitation of the essential teachings of the present invention.

FIG. 1 shows an exemplary computing environment 100 in which the present invention may be implemented. Environment 100 includes a plurality of local networks such as Ethernet network 102, FDDI network 103 and Token ring network 104. Essentially, a number of computing devices and groups of devices are interconnected through a network 101. For example, local networks 102, 103 and 104 are each coupled to network 101 through routers 109. LANs 102, 103 and 104 may be implemented using any available topology and may implement one or more server technologies including, for example a UNIX, Novell, or Windows NT, or peer-to-peer type network. Each network may include distributed storage implemented in each device and typically includes some mass storage device coupled to or managed by a server computer. Network 101 comprises, for example, a public network such as the Internet or another network mechanism such as a fibre channel fabric or conventional WAN technologies.

Local networks 102, 103 and 104 may include one or more clients 107 such as workstations, computers, or the like. One or more clients 107 may be configured as an application and/or file server. Each local network 102, 103 and 104 may include a number of shared devices (not shown) such as printers, file servers, mass storage and the like. Similarly, devices may be shared through network 101 to provide application and file services, directory services, printing, storage, and the like. Interfaces 109 provide a physical connection between the various devices through network 101. The interfaces may be various network devices which provide connectivity to the network 101. For example an interface 109 may by a router that implements desired access end security protocols to manage access through network 101. It is noted that an interface 109 may be a switch, bridge, router or other network device that provides connectivity between to the network 101 and/or connectivity between devices in one or more networks.

Clients 107 may be implemented as any kind of network appliance having sufficient computational function to execute software needed to establish and use a connection to network 101. Clients 107 may comprise workstation and personal computer hardware executing commercial operating systems such as Unix variants, Microsoft Windows, Macintosh OS, and the like. At the same time, some clients 107 comprise portable or handheld devices using wireless connections through a wireless access provider such as personal digital assistants and cell phones executing operating system software such as PalmOS, WindowsCE, EPOCOS, and the like. Moreover, the present invention is readily extended to network devices such as office equipment, vehicles, and personal communicators that make occasional connection through network 101.

Each of the devices shown in FIG. 1 may include memory, mass storage, and a degree of data processing capability sufficient to manage their connection to network 101. The computer program devices in accordance with the present invention are implemented in the memory of the various devices shown in FIG. 1 and enabled by the data processing capability of the devices shown in FIG. 1. In addition to local memory and storage associated with each device, it is often desirable to provide one or more locations of shared storage such as disk farm 116 that provides mass storage capacity beyond what an individual device can efficiently use and manage. Selected components of the present invention may be stored in or implemented in shared mass.

Figure 2:
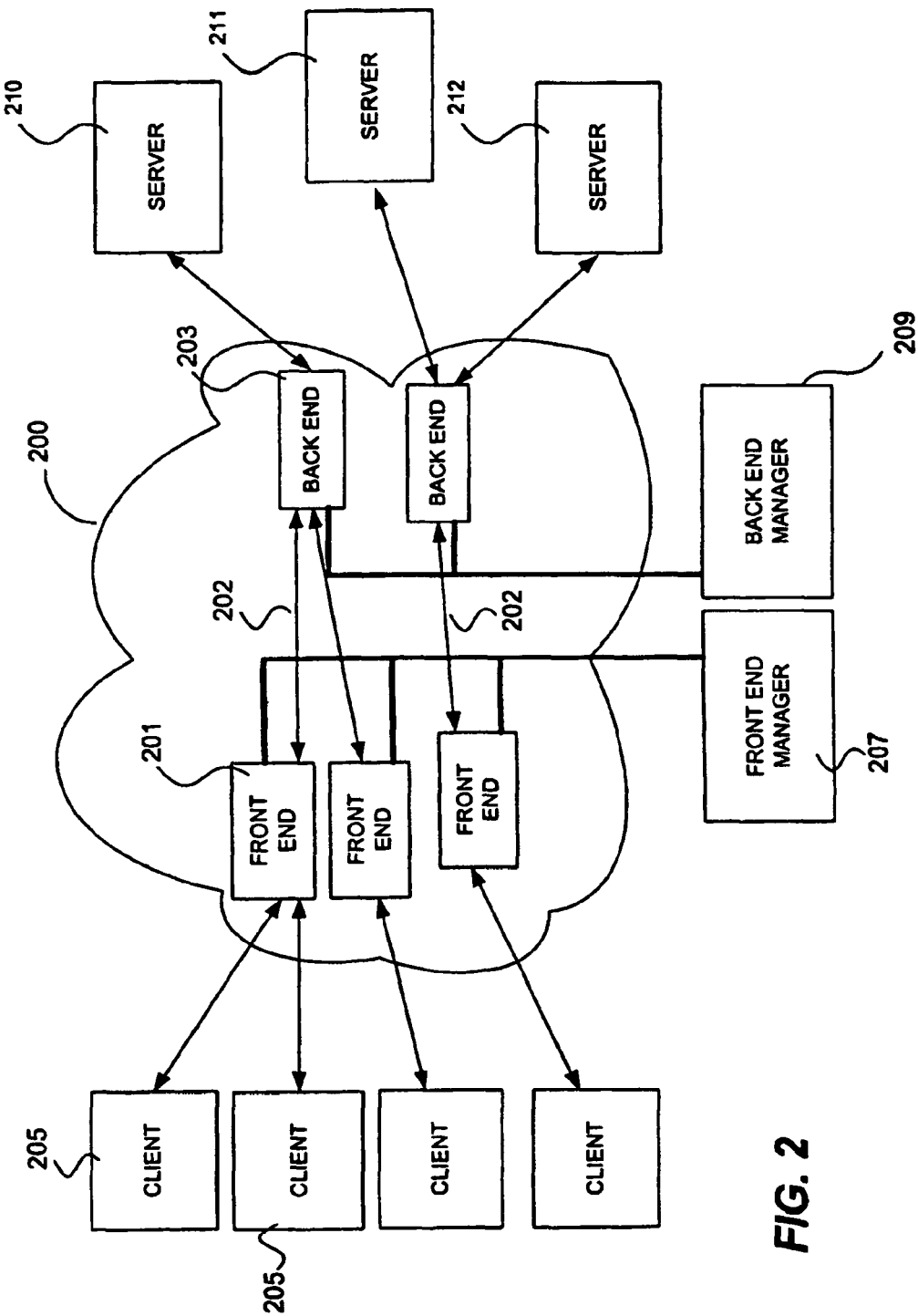
FIG. 2 is a block diagram illustrating components of an embodiment of the present invention.

As can be seen from FIG. 2, the present invention may operate in a manner akin to a private network 200 implemented within the Internet infrastructure. Private network 200 enhances communications between a client 205 and a web site 210 by implementing any of a variety of processes that enhance efficiency and/or functionality independently of client 205 and/or server 210. These processes include time synchronization processes, quality of service management processes, compression processes, security processes, and error correction processes.

In the specific examples herein client 205 comprises a network-enabled graphical user interface such as a web browser. However, the present invention is readily extended to client software other than conventional web browser software. Any client application that can access a standard or proprietary user level protocol for network access is a suitable equivalent. Examples include client applications for file transfer protocol (FTP) services, voice over Internet protocol (VoIP) services, network news protocol (NNTP) services, multi-purpose internet mail extensions (MIME) services, post office protocol (POP) services, simple mail transfer protocol (SMTP) services, as well as Telnet services. In addition to network protocols, the client application may access a network application such as a database management system (DBMS) in which case the client application generates query language (e.g., structured query language or "SQL") messages. In wireless appliances, a client application may communicate via a wireless application protocol or the like.

For convenience, the term "web site" is used interchangeably with "web server" in the description herein although it should be understood that a web site comprises a collection of content, programs and processes implemented on one or more web servers. A web site is owned by the content provider such as an e-commerce vendor whereas a web server refers to set of programs running on one or more machines coupled to an Internet node. The web site 210 may be hosted on the site owner's own web server, or hosted on a web server owned by a third party.

The private network is defined by a front-end mechanism 201 that serves as an access point for client-side communications. It is noted, as discussed above, that client-side communications may be directly communicated to a front-end mechanism 201 or may be communicated through one or more network devices such as an interface 109 or multiple interfaces. The front-end 201 may implement a gateway that functions as a proxy for the web server(s) implementing web site 210 (i.e., from the perspective of client 205, gateway 201 appears to be the web site 210). A transport link 202 may then be implemented by cooperative actions of the front-end 201 and back-end 203. For instance, the back-end 203 may processes and directs data communication to and from web site 210.

Front-end mechanism 201 serves as a gateway for client-side communications. Front-end 201 may comprise, for example, a device that sits "close" to clients 205. By "close", it is meant that the average latency associated with a connection between a client 205 and a front-end 201 is less than the average latency associated with a connection between a client 205 and a web site 210. Desirably, front-end computers have as fast a connection as possible to the clients 205. For example, the fastest available connection may be implemented in a point of presence (POP) of an Internet service provider (ISP) 106 used by a particular client 205. However, the placement of the front-ends 201 can limit the number of browsers that can use them. Because of this, in some applications it is more practical to place one front-end computer in such a way that several POPs can connect to it. Greater distance between front-end 201 and clients 205 may be desirable in some applications as this distance will allow for selection amongst a greater number front-ends 201 and thereby provide significantly different routes to a particular back-end 203. This may offer benefits when particular routes and/or front-ends become congested or otherwise unavailable.

Transport link 202 is capable of communicating data packets using a proprietary protocol over the public Internet infrastructure. Hence, the present invention does not require heavy infrastructure investments and automatically benefits from improvements implemented in the general purpose network 101. Unlike the general purpose Internet, the front-end 201 and back-end 203 are programmably assigned to serve access to one or more web sites 210 at any given time.

It is contemplated that any number of front-end and back-end mechanisms may be implemented cooperatively to support the desired level of service required by a web site owner. The present invention may implement a many-to-many mapping of front-ends to back-ends. Because the front-end to back-end mappings can by dynamically changed, a fixed hardware infrastructure can be logically reconfigured to map more or fewer front-ends to more or fewer back-ends as needed.

Front-end 201 together with back-end 203 function to reduce traffic across the transport link 202 and to improve response time for selected browsers. For example, traffic may be reduced by compressing data and serving browser requests from cache for fast retrieval. Also, the blending of request datagrams results in fewer request:acknowledge pairs to reliably transport data and so reduces the overhead associated with transporting a given amount of data. Moreover, resend traffic is significantly reduced further reducing the traffic. Response time is improved for select privileged users and for specially marked resources by determining the priority for each HTTP transmission.

Front-end 201 together with back-end 203 may be closely coupled to the Internet backbone. This means they have high bandwidth connections, can expect fewer hops, and have more predictable packet transit tine than could be expected from a general-purpose connection. Clients 205 no longer connect directly to the web server 210. Instead, clients 205 connect to front-end programs 201, which simulate the functions of web server 210. Client data may then be sent, using TMP, to the back-end 203 and then to the web server 210. Running multiple clients 205 over one large connection provides several advantages Since all client data is mixed, each client can be assigned a priority. Higher priority clients, or clients requesting higher priority data, can be preferentially allocated the network bandwidth so they receive access to the channel sooner while ensuring low-priority clients receive sufficient service to meet their needs.

The large connection can be permanently maintained, shortening the many TCP/IP connection sequences required for many clients connecting and disconnecting, as occurs with TCP/IP transaction based systems.

Using a proprietary protocol is advantageous in that it allows the use of more effective techniques to improve data throughput and makes better use of existing bandwidth during periods when the network is congested.

A particular advantage of the architecture shown in FIG. 2 is that it is readily scaled. Any number of client machines 205 may be supported. In a similar manner, a web site owner may choose to implement a site using multiple web servers 210. To avoid congestion, additional front-ends 201 may be implemented or assigned to particular web sites. Each front-end 201 is dynamically re-configurable by updating address parameters to serve particular web sites. Hence, when quality of service drops because of a large number of client accesses, an additional front-end 201 can be assigned to the web site to distribute traffic across a broader base.

In the particular examples, this is implemented by a front-end manager component 207 that communicates with multiple front-ends 201 to provide administrative and configuration information to front-ends 201. Each front-end 201 includes data structures for storing the configuration information, including information identifying the IP addresses of web servers 210 to which they are currently assigned. Other administrative and configuration information stored in front-end 201 may include mapping information for prioritizing data from and to particular clients, quality of service information, and the like.

Similarly, additional back-ends 203 can be assigned to a web site to handle increased traffic. Back-end manager component 209 may couple to one or more back-ends 203 to provide centralized administration and configuration service. Back-ends 203 may include data structures to hold current configuration state, quality of service information end the like. In the particular examples, front-end manager 207 and back-end manager 209 serve multiple web sites 210 and so are able to manipulate the number of front-ends and back-ends assigned to each web site 210 by updating this configuration information. When the congestion for the site subsides, the front-end 201 and back-end 203 can be reassigned to other, busier web sites. These end similar modifications are equivalent to the specific examples illustrated herein.

Figure 3:
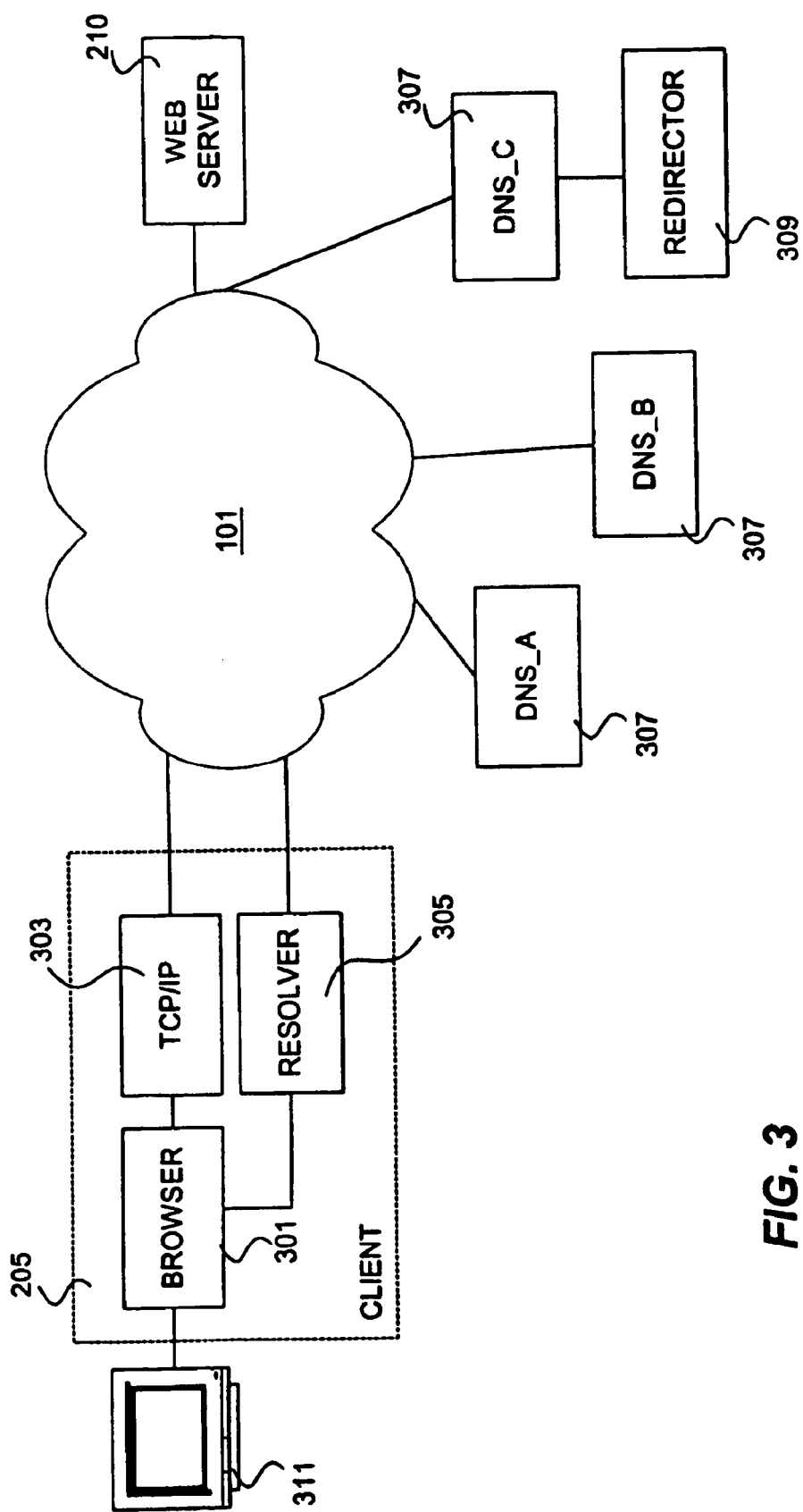
FIG. 3 is a block diagram illustrating a domain name system and a redirection system used in an embodiment of the present invention.

FIG. 3 illustrates a domain name server (DNS) redirection mechanism that illustrates how a client 205 may be connected to a front-end 201. The DNS systems is defined in a variety of Internet Engineering Task Force (IETF) documents such as RFC0883, RFC 1034 and RFC 1035 which are incorporated by reference herein. In a typical environment, a client 205 executes a browser 301, TCP/IP stack 303, and a resolver 305. For reasons of performance and packaging, browser 301, TCP/IP stack 303 and resolver 305 are often grouped together as routines within a single software product. Browser 301 functions as a graphical user interface to implement user input/output (I/O) through a monitor and associated keyboard, mouse, or other user input device (not shown). TCP/IP stack 303 may communicate with browser 301 to convert data between formats suitable for browser 301 and IP format suitable for Internet traffic. TCP/IP stack 303 may also implement a TCP protocol that manages transmission of packets between client 205 and an internet service provider (ISP) or equivalent access point.

IP protocol requires that each data packet include, among other things, an IP address identifying a destination node. To provide a more flexible addressing system the Internet implements a system of domain name servers that map alphanumeric domain names to specific IP addresses. This system enables a name space that is more consistent reference between nodes on the internet and avoids the need for users to know network identifiers, addresses, routes and similar information in order to make a connection.

The domain name service may be implemented as a distributed database managed by domain name servers (DNSs) 307 such as DNS_A, DNS_B and DNS_C shown in FIG. 3. Each DNS relies on <domain name:IP> address mapping data stored in master files scattered through the hosts that use the domain system. These master files may be updated by local system administrators. Master files typically comprise text files that are read by a local name server, and hence become available through the name servers 307 to users of the domain system.

The user programs (e.g., clients 205) access name servers through standard programs such as resolver 305. Resolver 305 includes an address of a DNS 307 that serves as a primary name server. When presented with a reference to a domain name (e.g., http://www.circadence.com) for example, resolver 305 sends a request to the primary DNS (e.g., DNS_A in FIG. 3). The primary DNS 307 returns either the IP address mapped to that domain name, a reference to another DNS 307 which has the mapping information (e.g., DNS_B in FIG. 3), or a partial IP address together with a reference to another DNS that has more IP address information. Any number of DNS-to-DNS references may be required to completely determine the IP address mapping.

In this manner, the resolver 305 becomes aware of the IP address mapping which is supplied to TCP/IP component m 303. Client 205 may cache the IP address mapping for future use. TCP/IP component 303 uses the mapping to supply the correct IP address in packets directed to a particular domain name so that reference to the DNS system need only occur once.

In accordance with the domain mapping principles of the present invention, at least one DNS server 307 may be owned and controlled by system components in accordance with the present invention. For example, DNS_C in FIG. 3 receives information from a redirector component 309. Redirector 309 is in communication with front-end manager 207 and back-end manager 209 to obtain information on current front-end and back-end assignments to a particular web site 210. The system operator publishes information to the domain system to indicate that domains specifying a particular web server 210 can satisfy DNS requests for the IP address of web server 210 by way of reference to DNS_C.

A conventional DNS is intended to be updated infrequently by reference to its associated master file. In contrast, the master file associated with DNS_C is dynamically updated by redirector 309 to reflect current assignment of front-end 201 and back-end 203. In operation, a reference to web server 210 (e.g., http://www.circadence.com) may result in an IP address returned from DNS_C that points to any selected front-end 201 that is currently assigned to web site 210. Likewise, web site 210 can identify a currently assigned back-end 203 by direct or indirect reference to DNS_C.

Front-end 201 typically receives information directly from front-end manager 207 about the address of currently assigned back-ends 203. Similarly, back-end 203 is aware of the address of a front-end 201 associated with each data packet. Hence, reference to the domain system is not required to map a front-end 201 to its appropriate back-end 203.

A redirector 309 may operate to redirect network traffic from a specified web site 210 to a gateway, such as a front-end 201, that has an established communication channel with the specified web site. This allows the client-to-site request/response traffic to be conducted over the established communication channel, such as the transport link 202, that preferably offers enhanced characteristics as compared to the communication channel provided by direct communication between the client application and the web site.

A variety of traditional redirection techniques may be used to migrate a client request from the server that receives the request to another server that can handle the request efficiently. In contrast, the present invention effectively migrates the connection between the client 205 and the web server 210 to another channel, such as a transport link 202, that links the same client with the same web server. The present invention is somewhat non-intuitive because it adds a level of indirection in the communication between the client 205 and the web site 210. However, any inefficiencies caused by the added indirection are more than compensated for by the increased functionality and performance made possible by intentional redirection of the request/response traffic to desirable gateway mechanisms and enhanced communication channels, such as the front-end/back-end mechanisms 201,203 which provide a transport link 202.

In one embodiment, one or more redirectors 309 may be coupled to the network at a specified network addresses. A request/response traffic flow is initiated between a client application (e.g., a web browser) and a network resource (e.g., a web site 210) at a specified network address. The conventional domain name service 307 may be used to resolve requests to the network address. The web site 210 redirects the client application to one of the redirectors 309. In turn, the redirector 309 selects a gateway (e.g., front-end 201) from a pool of gateway machines that can support a communication channel with the web site 210. The redirector 309 then redirects the client 205 to the selected gateway.

In a sense the redirector 309 acts as a private domain name resolver that returns a network address to the client machine in response to a resolution request. Unlike the conventional DNS system, however, the returned network address points to a selected gateway or front-end 201 rather than the web site 210 itself. The redirector 309 selects one of the gateways based on any number of criteria specified by the client application (or its user), the web site (or its administrator), or any other interested third party. Example criteria include current quality of service metrics, identification and/or location (e.g., distance) of the client application, relative criticality of the data being transported by the request/response traffic, and the like. The selected front-end 201 may be configured to provide the enhanced channel, such as a transport link 202, to the web site 210 using, for example, a back-end server 203. An enhanced channel may already exist and such existence may be a criteria used to select a particular front-end 201 from the pool of front-ends.

The redirection mechanism provided herein can also be used to exchange state information using existing cookie management functionality and mechanisms. The cookie management mechanisms are a desirable tool for state information exchange in that they are ubiquitous, robust, and flexible. However, existing systems put virtually all management control in the web server or network entity that creates the cookie, even though the cookie is stored on a client machine. For example, a cookie can only be transmitted from a browser to an entity within the same domain (or subdomain) as the entity that wrote the cookie initially. This means that a web server xyz.com cannot read cookies created by web server abc.com.

The present invention allows a web site to cause the request/response traffic to be migrated to a common gateway machine, such as a front-end 201 or back end 203, that can be used to read and/or write cookies. Cookies that can be accessed by the gateway can be used by any web site that can communicate with the gateway. In this type of application, once the cookie services are provided the client-server channel can be migrated back to a direct channel between the client and original web server, or to a channel between the client and a new, third party web site. Cookie information can be migrated along with the channel to enable more than one web site to benefit from the state information stored in the cookies.

The redirector 309 may be implemented using a conventional off-the shelf web server, as an extension to a conventional web server, or as a minimally functional ("bare bones") server implementing an HTTP request response interface as well as mechanisms for handling cookie end set cookie headers in the HTTP traffic. A full service web server is desirable where other applications and services can be usefully employed at the redirector server site.

The redirector 309 can be configured to operate in an implicit fashion as well. In such an application a mechanism is used at the client application, or another location intermediate the client and target web server to intercept a client-generated request to redirect the request to a front-end 201. A lightweight component can be integrated with or plugged into a client-side web browser program, for example, to read all (URL's of outgoing request packets). URLs that match specified domains can be automatically directed to a redirector for assignment to a getaway machine, such as a front-end 201.

In the above embodiments, the target or originating web site maintains ownership of its domain name and so must serve in a role as the initial contact for a client request. In these example embodiments the web site 210 initiates the redirection of the client to a gateway. Alternatively, the web site 210 can transfer ownership of its domain name to a redirector 309 or a third party entity that exists on the network to redirect traffic. In this example, the Internet domain name service may resolve the client request directly to the redirector 309 rather than a web server 210 within the target web site. Where multiple redirectors 309 are implemented in the network, each redirector can own the domain names for a plurality of web sites 210.

In another example, the redirector 309 can be used to handle secure communication such as HTTPS connections. In a conventional web server design the web server software implements specific ports for handling secure communications. In accordance with the present invention, some or all of the pool of front-ends 201 may implement a similar secure port. In the event a redirector 309 receives a redirection request involving secure communication, the redirector selects a front-end 201 or gateway that has a secure port, and then returns information to the client application identifying the network address of the selected secure port. The front-end 201 may then handle communication in a secure manner using conventional or proprietary security mechanisms.

In operation, the redirector 309 receives a redirected request from the client application that identifies the target web site's URL. The redirector 309 generates a response packet giving the client application the network address of a selected gateway. The client application requests include URLs of two types: absolute and relative. Absolute URLs specify the complete path to the network resource, whereas relative URLs include only enough information for the web site to identify the content in relation to the current resource location. Once the client application is redirected to a gateway, however, relative URLs are not valid with respect to the structure and resources of the gateway itself. To handle relative URLs, the gateway includes relative URL resolver mechanisms 305 to facilitate non-proxy front end functionality. These mechanisms essentially operate to manipulate the relative URL so as to identify the corresponding absolute URL. In one example, the absolute URL of the target web site (obtained from the initial client generated request) is appended to the relative URL to form a valid absolute URL for the specified resource. The front-end 201 (i.e., gateway) can use the generated absolute URL to access appropriate resources.

Figure 4:
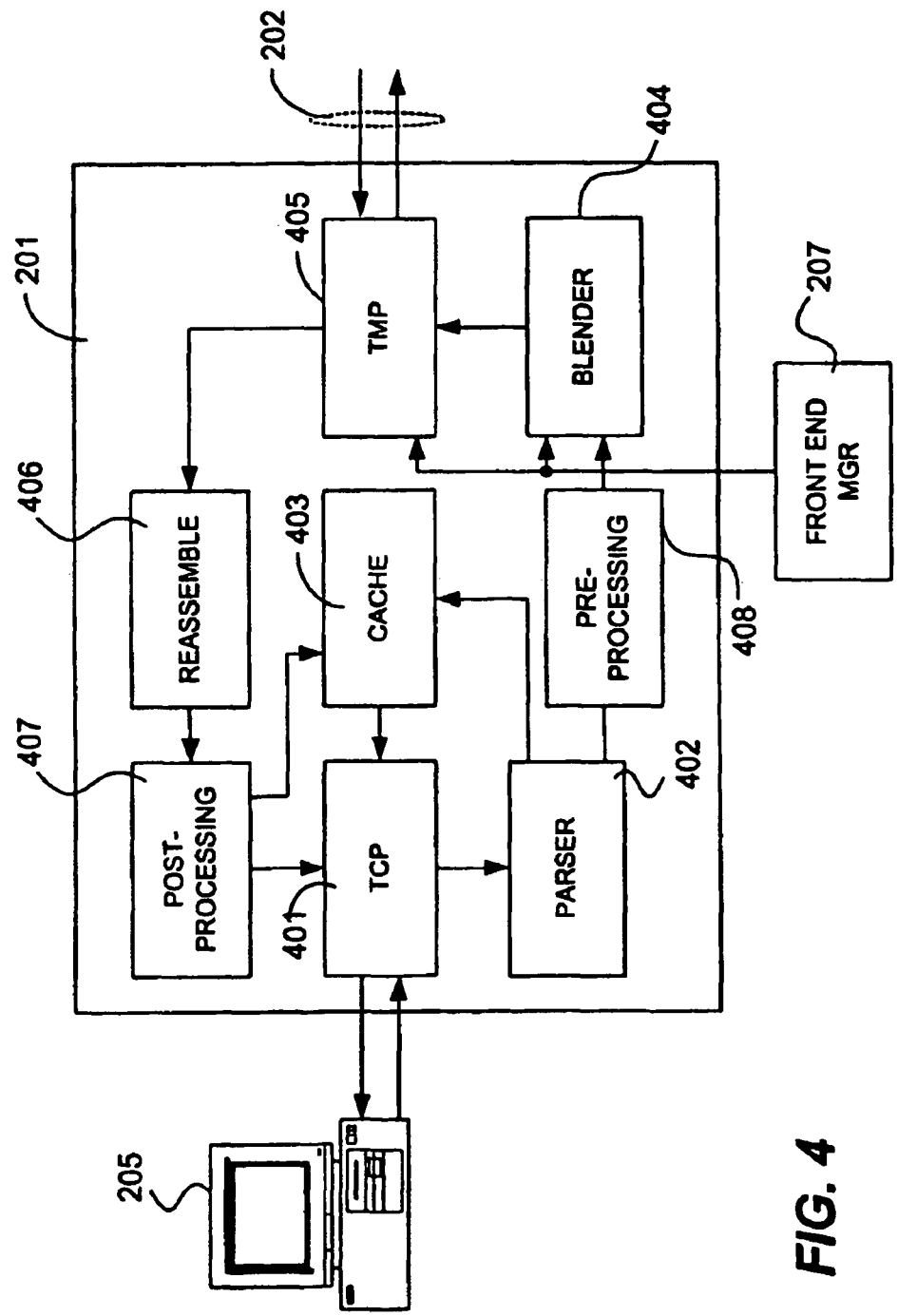
FIG. 4 is a block diagram illustrating a data blender prioritization mechanism of an embodiment of the present invention.

FIG. 4 illustrates principle functional components of an exemplary front-end 201 in greater detail. Primary functions of the front-end 201 include translating transmission control protocol (TCP) packets from client 205 into TMP packets used in the system in accordance with the present invention. It is contemplated that various functions described in reference to the specific examples may be implemented using a variety of data structures and programs operating at any location in a distributed network. For example, a front-end 201 may be operated on a network appliance 107 or server within a particular network 102, 103, or 104 shown in FIG. 1.

TCP component 401 includes devices for implementing physical connection layer and Internet protocol (IP) layer functionality. Current IP standards are described in IETF documents RFC0791, RFC0950, RFC0919, RFC0922, RFC792, RFC1112 that are incorporated by reference herein. For ease of description and understanding, these mechanisms are not described in great detail herein. Where protocols other than TCP/IP are used to couple to a client 205, TCP component 401 is replaced or augmented with an appropriate network protocol process.

TCP component 401 communicates TCP packets with one or more clients 205. Received packets are coupled to parser 402 where the Internet protocol (or equivalent) information is extracted. TCP is described in IETF RFC0793 which is incorporated herein by reference. Each TCP packet includes header information that indicates addressing and control variables, and a payload portion that holds the user-level data being transported by the TCP packet. The user-level data in the payload portion typically comprises a user-level network protocol datagram.

Parser 402 analyzes the payload portion of the TCP packet. In the examples herein, HTTP is employed as the user-level protocol because of its widespread use and the advantage that currently available browser software is able to readily use the HTTP protocol. In this case, parser 402 comprises an HTTP parser. More generally, parser 402 can be implemented as any parser-type logic implemented in hardware or software for interpreting the contents of the payload portion. Parser 402 may implement file transfer protocol (FTP), mail protocols such as simple mail transport protocol (SMTP), structured query language (SQL) and the like. Any user-level protocol, including proprietary protocols, may be implemented within the present invention using appropriate modification of parser 402.

To improve performance, front-end 201 optionally includes a caching mechanism 403. Cache 403 may be implemented as a passive cache that stores frequently and/or recently accessed web pages or as an active cache that stores network resources that are anticipated to be accessed. In non-web applications, cache 403 may be used to store any form of data representing database contents, files, program code, and other information. Upon receipt of a TCP packet, HTTP parser 402 determines if the packet is making a request for data within cache 403. If the request can be satisfied from cache 403, the data is supplied directly without reference to web server 210 (i.e., a cache hit). Cache 403 implements any of a range of management functions for maintaining fresh content. For example, cache 403 may invalidate portions of the cached content after an expiration period specified with the cached data or by web sever 210. Also, cache 403 may proactively update the cache contents even before a request is received for particularly important or frequently used data from web server 210. Cache 403 evicts information using any desired algorithm such as least recently used, least frequently used, first in/first out, or random eviction. When the requested data is not within cache 403, a request is processed to web server 210, and the returned data may be stored in cache 403.

Several types of packets will cause parser 404 to forward a request towards web server 210. For example, a request for data that is not within cache 403 (or if optional cache 403 is not implemented) will require a reference to web server 210. Some packets will comprise data that must be supplied to web server 210 (e.g., customer credit information, form data and the like). In these instances, HTTP parser 402 couples to data blender 404.

In accordance with the present invention, front-end 201 implements security processes, compression processes, encryption processes, error correction processes and the like to condition the received data for improved transport performance and/or provide additional functionality. These processes may be implemented within pre-processing unit 408, or alternatively implemented within any of the functional components within front-end 201. Also, front-end 201 may implement a prioritization program to identify packets that should be given higher priority service. A prioritization program requires only that front-end 201 include a data structure associating particular clients 205 or particular TCP packet types or contents with a prioritization value. Based on the prioritization value, parser 402 may selectively implement such features as caching, encryption, security, compression, error correction and the like to improve performance and/or functionality. The prioritization value is provided by the owners of web site 210, for example, and may be dynamically altered, statically set, or updated from time to time to meet the needs of a particular application.

Blender 404 slices and/or coalesces the data portions of the received packets into a more desirable "TMP units" that are sized for transport through the TMP mechanism 212. The data portion of TCP packets may range in size depending on client 205 and any intervening links coupling client 205 to TCP component 401. Moreover, where compression is applied, the compressed data will vary in size depending on the compressibility of the data. Data blender 404 receives information from front-end manager 217 that enables selection of a preferable TMP packet size. Alternatively, a fixed TMP packet size can be set that yields desirable performance across TMP mechanism 212. Data blender 404 also marks the TMP units so that they can be re-assembled at the receiving end.

Data blender 404 may also serve as a buffer for storing packets from all appliances 107 that are associated with front-end 201. In accordance with the present invention, data blender 404 may associate a prioritization value with each packet. This prioritization value can be provided by front-end manager 207. Blender 404 mixes data requests coming into front-end 201 into a cohesive stream of packets sent to back-end 203. Data blender 404 maintains buffers that buffer data by priority, and holds lower-priority data until an appropriate time to send. In this manner, some data can be prioritized over other data. Alternatively, blender 404 may implement some form of fairness or arbitration algorithm that ensures low priority data receive some bandwidth. The data blender 404 may send data to TMP unit 405 whenever the transport link 202 has bandwidth available.

TMP unit 405 implements a TMP protocol, such as described further below. Generally speaking, TMP is a protocol adapted to improve performance for multiple client-server channels operating over a single connection. Front-end TMP unit 405 in cooperation with a corresponding back-end TMP unit 505 shown in FIG. 5 implement the end points of transport link 202. The transport link in accordance with the present invention creates and maintains a stable connection between two processes for high-speed, reliable, adaptable communication.

TMP is not merely a substitute for the standard TCP environment. TMP may not outperform TCP in a conventional Internet, LAN or WAN environment. However, in such environments, TMP will perform at least as well as TCP. TMP is designed to perform particularly well in an environment on the Internet backbone. As such, TMP connections will have relatively few hops in comparison to conventional TCP connections. Furthermore, TMP connections are made less often than TCP connections. Once a TMP connection or transport link is made it may remain up unless there is some kind of direct intervention by an administrator or there is some form of connection breaking network error.

The transport link 202 thus provides improved performance in its environment as compared to conventional TCP channels, but it is recognized that transport link 202 resides on the open, shared Internet backbone in the preferred implementation. Hence, TMP must live together with many protocols and share the pipe efficiently in order to allow the other communications fair access to the shared communication bandwidth.

Also shown in FIG. 4 are reassemble mechanism 406 and post-processing mechanism 407 that process incoming (with respect to client 205) data. TMP unit 405 receives TMP packets from transport link 202 and extracts the TMP data units. Using the appended sequencing information, the extracted data units are reassembled into TCP data packet information by reassemble mechanism 406. Assembled data is then forwarded to post-processing mechanism 407 that formats the data into HTTP format documents or other equivalent format used by the browser or other application executing on the client 205. Hence, post-processing mechanism 407 restores data to usable form by a client 205 without additional processing. Post-processing mechanism 407 may also implement data decompression where appropriate, decryption, and handle caching when the returning data is of a cacheable type. A front-end may, but need not include a post-processing 407 and/or pre-processing mechanism 408 as will be described further below.

Figure 5:
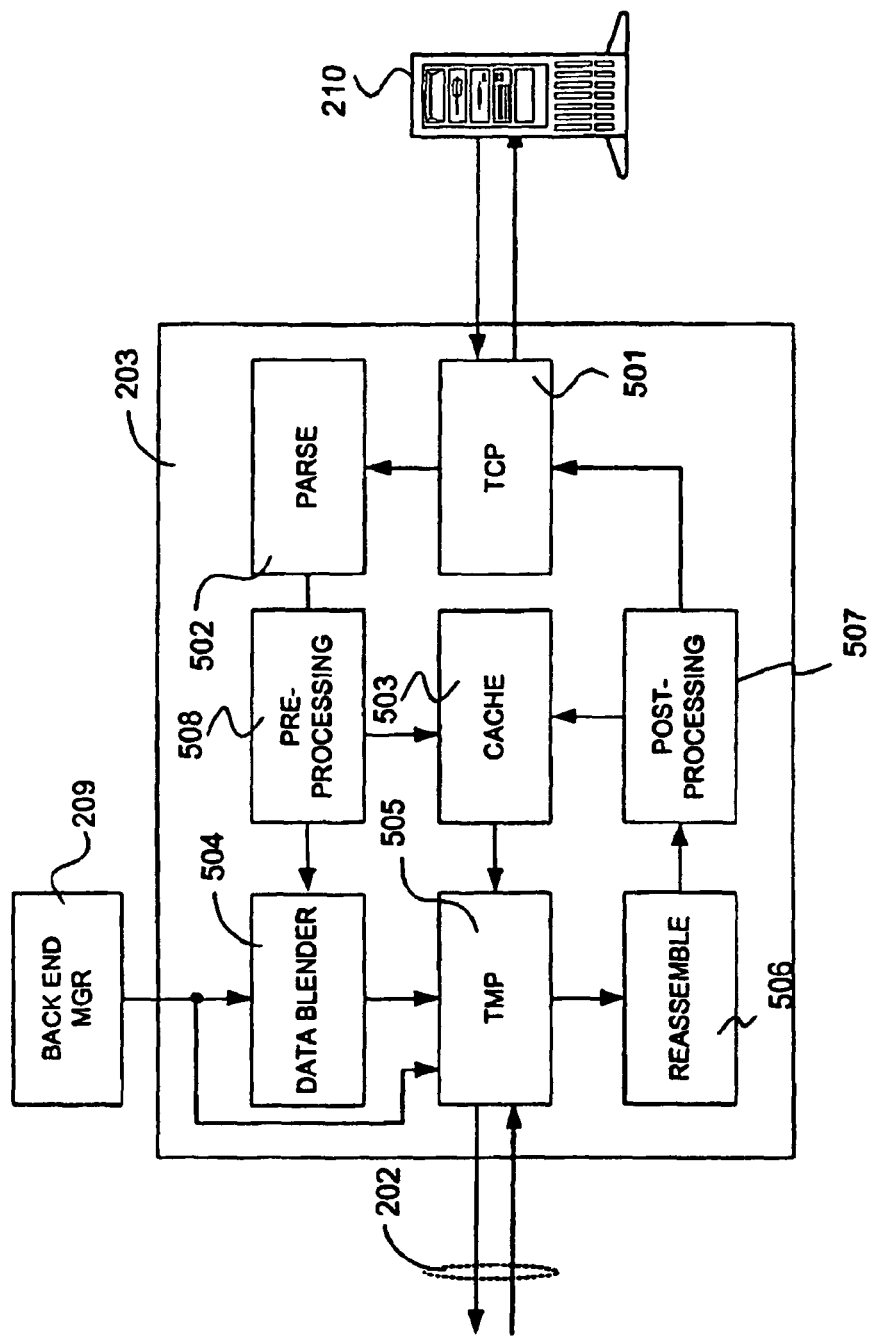
FIG. 5 is a block diagram illustrating a back-end mechanism of an embodiment of the present invention.

FIG. 5 illustrates functional components of an exemplary back-end 203 in greater detail. Primary functions of the back end 203 include serving as a proxy for client 205 from the perspective of web server 210, translating transmission control protocol (TCP) packets from web server 210 into TMP packets as well as translating TMP packets into the one or more corresponding TCP packets generated by clients 205.

TMP unit 505 receives TMP packets from transport link 202 and passes them to reassemble mechanism 506 where they are reassembled into the corresponding TCP packets. Reassemble mechanism 506 may implement other functionality such as decompression, decryption, end the like to meet the needs of a particular application. The reassembled data is forwarded to TCP component 501 for communication with web server 210. It is noted that a back-end may but need not include a cache 503 to enhance data communication such as described above with regard to the cache 403 of the front-end.

TCP data generated by the web server process are transmitted to TCP component 501 and forwarded to HTTP parser 502. Parser 502 operates in a manner analogous to parser 402 shown in FIG. 4 to extract the data portion from the received TCP packets, perform optional compression, encryption and the like, and/or forward those packets to data blender 504. Data blender 504 may operate in a manner akin to data blender 404 shown in FIG. 4 to buffer and prioritize packets in a manner that is efficient for TMP transfer. Priority information may be received by, for example, back-end manager 209 based upon criteria established by the web site owner. TMP data may be streamed into TMP unit 505 for communication via transport link 202. Back-end may optionally include a pre-processing mechanism 508 and/or post-processing mechanism 507. The pre-processing mechanism 508 and/or post-processing mechanism 507 may be analogous to the pre-processing mechanism and/or post-processing mechanism of a front-end, as will be described further below.

Figure 6:
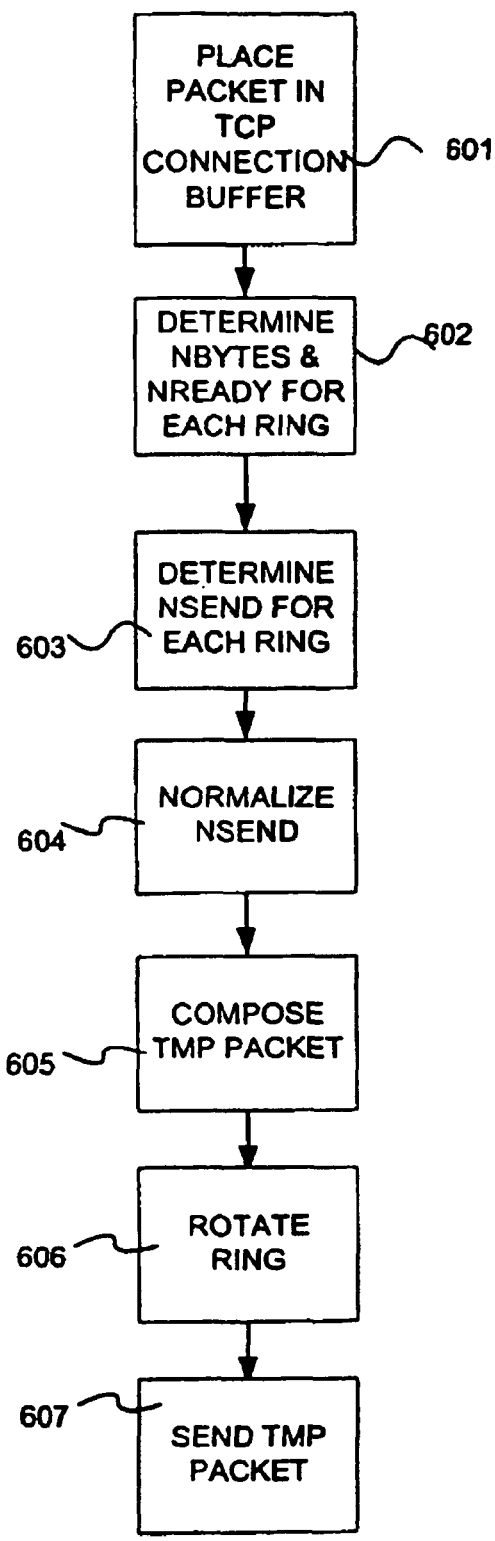
FIG. 6 is a flow-diagram illustrating processes involved in an embodiment of the present invention.
Figure 7:
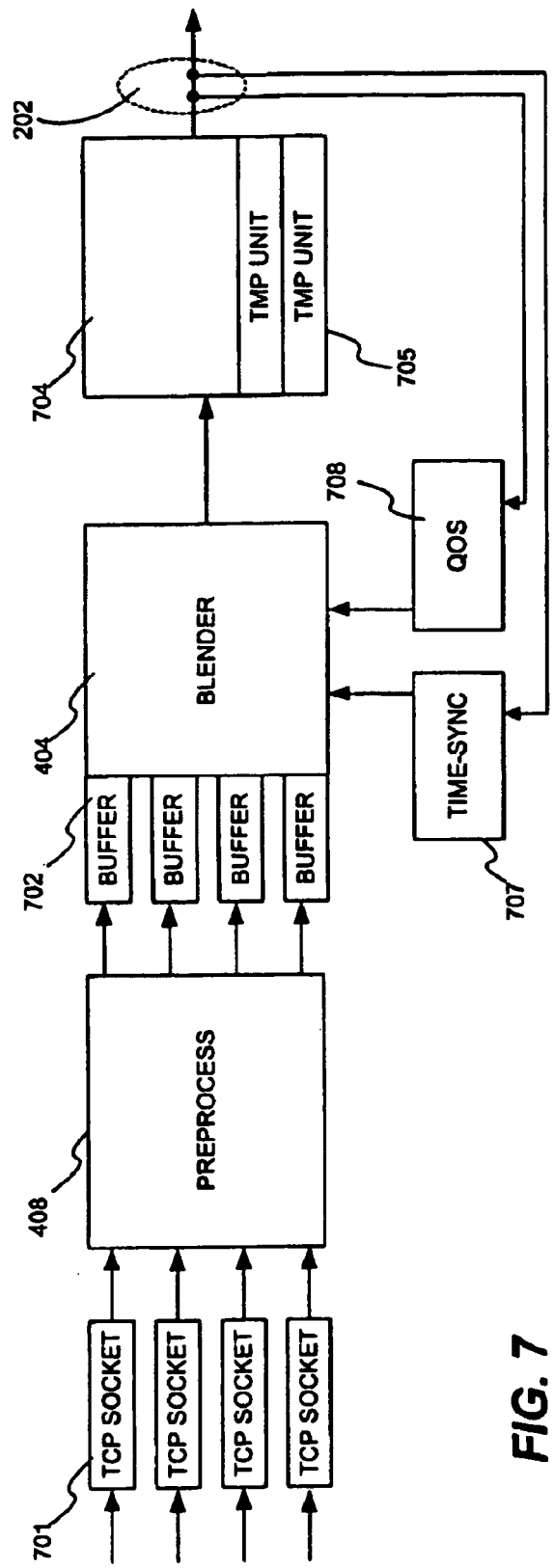
FIG. 7 is block diagram illustrating components of an embodiment of the present invention.

In an exemplary implementation, illustrated in FIG. 6 and FIG. 7, a "TMP connection" comprises a plurality of "TCP connection buffers", logically arranged in multiple "rings". Each TCP socket 701 maintained between the front-end 201 and a client 205 corresponds to a TCP connection buffer 702. Preprocessing may be performed by preprocessor 408 on the TCP connection buffer data to provide, for example, data compression, encryption, and/or error correction coding before the data is placed in the corresponding TCP connection buffer 702.

When a TCP connection buffer 702 is created, it is assigned a priority. For purposes of the present invention, any algorithm or criteria may be used to assign a priority. Each priority ring is associated with a number of TCP connection buffers having similar priority. In a specific example, five priority levels are defined corresponding to five priority rings. Each priority ring is characterized by the number of connection buffers it holds (nSockets), the number of connection buffers it holds that have data waiting to be sent (nReady) and the total number of bytes of data in all the connection buffers that it holds (nBytes).

A TCP connection buffer 702 is created and placing one or more preprocessed packets from a TCP socket 701 within the TCP connection buffer 702. A TCP connection buffer 702 is sized to hold a plurality of TCP packets and each TCP connection buffer 702 is associated with a priority value. The priority value is assigned when TCP connection buffer 702 is first created and may be dynamically changed in operation.

When sending data, blender 404 performs a series of processes outlined in FIG. 6 that access data from the TCP connection buffers 702 to form TMP units 705 that are transmitted. The processes performed by blender 404 include:

In step 602, determine the number of bytes available to be sent from each ring (nBytes), and the number of TCP connections that are ready to send (nReady).

In step 603, determine how many bytes should be sent from each ring. This is based on a weight parameter for each priority. The weight can be thought of as the number of bytes that should be sent at each priority this time through the loop.

The nSend value computed in the previous step 603 reflects the weighted proportion that each ring will have in a blended TMP packet, but the values of nSend do not reflect how many bytes need to be selected to actually empty most or all of the data waiting to be sent a single round. To do this, the nSend value is normalized to the ring having the most data waiting (e.g., nBytes=nSendNorm) in step 604. This involves a calculation of a factor: S=nBytes/(Weight*nReady) for the ring with the greatest nReady. Then, for each ring, calculate nReady*S*Weight to get the normalized value (nSendNorm) for each priority ring.

In step 605, sub-packets are sent from the different rings. This is done, for example, by taking a sub-packet from the highest priority ring and adding it to a TMP packet, then adding a sub-packet from each of the top two queues, then the top three, and so on. A variety of algorithms may be used to select particular sub-packets from the different rings to implement a desired level of fairness, prioritization, and quality of service.

Referring to step 606, within each ring, sub-packets are added round robin. When a sub-packet is added from a TCP connection buffer the ring is rotated so the next sub-packet the ring adds will come from a different TCP connection buffer. Each sub-packet can be up to 512 bytes in a particular example. If the connection buffer has less than 512 bytes waiting, the data available is added to the TMP packet.

In step 607, when a full TMP packet (roughly 1.5 kB in a particular example) is built, it is sent. This can have three or more sub packets, depending on their size. The TMP packet will also be sent when there is no more data ready.

TMP unit 405 (shown in FIG. 4) and TMP unit 505 (shown in FIG. 5) implement the TMP protocol that communicates packets between front-end 201 and back-end 203. The protocol may ride on top of universal datagram protocol (UDP) in that network devices that handle TMP packets treat them as UDP packets. However, TMP packets differ from standard UDP packets in that they have additional unique header data defining a unique set of messages, outlined below, to support the TMP functionality. Also, the manner in which TMP packets are transferred onto the physical communication channel, referred to as the protocol behavior, differs significantly from TCP.

TMP packets have a header that contains packet control information. Some TMP packets also carry extra information in a data or payload portion. The packet control information includes, for example:
  A connection number (that identifies the connection to which it belongs)
  A checksum for data integrity
  A set of flags (which may be used or remain unused) for a variety of purposes
  A message type identifier
  The confirmed message type The rest of the packet header contains information or data which can differ between packets, depending on the message type.

A short list of messages that can be sent by the TMP protocol includes: data, acknowledgments, connection requests and replies, time synchronization requests and replies, resent data, control messages, QoS messages, status requests and replies, suspend messages, and alerts. Packet header content which is specific to the message type is as follows.
  Acknowledgment
  The last sequential confirmed sequence message
  The confirmed message sequence number.
  Time Synchronization Request
  Requester time index.
  Time Synchronization Reply
  The time that the request was received.
  The time that the reply was sent.
  Requester time index.
  Connection Request
  The connections index (zero for a new connection).
  Requested receiving port.
  An additional set of flags (which may be used or unused) for a variety of purposes.
  Connection Reply
  The replier's base time.
  A time offset from the point of receiving the request in milliseconds.
  The connections index (zero for a new connection).
  An additional set of flags (which may be used or unused) for a variety of purposes.
  Data
  Data sequence number.
  Time that the message was sent.

The rest of the packet comprises the packet body or payload portion. Alert and Acknowledge packets do not have bodies. All other packets contain bodies that carry additional information appropriate to the message itself (for example, a data packet will send the data itself).

It is important to note that alerts and QoS information are built into the protocol and do not need to be passed as data packets. Since these types of information are not built into TCP they would need to be sent as data, which might affect the application using the protocol. This means that the receiving end needs to process the packet only once to draw out the information it requires. In contrast, when QoS information is sent as a data packet in TCP, the receiving end has to process the packet as a data packet simply to get to the information that allows the alert or QoS information to be processed, which means that TCP must double the amount of processing for alerts and QoS information.

Of particular interest in the present invention, the exchange of time synchronization information 707 enables front-end 201 and back-end 203 to have a common time base and ascertain the time of issue of any received packet. While the current implementation does not include base time or time index data in the header of data packets, this information can readily be included in all message types, a subset of message types, and/or in a special message type defined for real-time data transport. In this manner, the recipient of a TMP packet knows with a high level of certainty when a received packet was transmitted, something that existing Internet protocols do not provide. In the case of TMP packets from a back-end 203 to a front-end 201, the information can be used by the front-end 201 as a factor in ordering responses to clients 205. In the case of TMP packets from a back-end 203 to a front-end 201, the information can be used by the front-end 203 as a factor in ordering responses to clients 205.

Rather than synchronizing clocks the front-end 201 and back-end 203 (i.e., absolute time synchronization), the time synchronization information 707 may indicate a differential between the clocks of the two machines (i.e., relative time synchronization). Relative time synchronization can be used substantially equivalently to information that would allow actual synchronization of the clocks. Accordingly, "time synchronization" and "time synchronized" refer inclusively to both absolute and relative time synchronization methods.

The time synchronization information 707 augments or replaces the "time to live" feature of conventional IP packets. Each IP packet specifies a time to live value that must be decremented by each router or device that handles the packet. As the time value can only be incremented in one-second units, the value becomes a hop count rather than an actual timing function. When a packet's time to live value is decremented to zero, it is discarded and must be retransmitted. In accordance with the present invention, the time to live value for TMP packets can be used more meaningfully as the recipient knows when the packet was actually sent and can set or reset the time to live value to a meaningful value when the packet leaves a front-end 201 or back-end 203.

As in all protocols, the messages in TMP have an order in which they are sent as well as particular defined situations in which they are sent. A typical TMP session might begin with a connection request. For reference, the end point that sends the connection request will be referred to as the front-end, and the receiver of the request will be referred to as the back-end, although the TMP protocol operates bi-directionally between front-ends and back-ends. The front-end 201 sends a connection request to the back-end 203, and the back-end 203 sends a connection reply back to the front-end 201. This reply will be either positive (connection accepted), or negative (connection refused). If the reply is positive, then the connection is established and the front-end and back-end can begin to exchange data.

TMP is a TCP-like protocol adapted to improve performance for multiple connections operating over a single pipe. The TMP transport link in accordance with the present invention creates and maintains a stable connection between two processes for high-speed, reliable, adaptable communication. TMP is not merely a substitute for the standard TCP environment. TMP is designed to perform particularly well in heterogeneous network environments such as the Internet. TMP connections are made less often than TCP connections. Once a TMP connection is made, it remains up unless there is some kind of direct intervention by an administrator or there is some form of connection-breaking network error. This reduces overhead associated with setting up, maintaining and tearing down connections normally associated with TCP.

Another feature of TMP is its ability to channel numerous TCP connections through a single transport link 202. The environment in which TMP resides allows multiple TCP connections to occur at one end of the system. These TCP connections may then be mapped to a single TMP connection. The TMP connection may then be broken down at the other end of the transport link 202 in order to traffic the TCP connections to their appropriate destinations. TMP includes mechanisms to ensure that each TMP connection gets enough of the available bandwidth to accommodate the multiple TCP connections that it is carrying.

Another advantage of TMP as compared to traditional protocols is the amount of information about the quality of the connection that a TMP connection conveys from one end to the other of a transport link 202. As often happens in a network environment, each end has a great deal of information about the characteristics of the connection in one direction, but not the other. QoS information 708 is exchanged between front-end 201 and back-end 203 in accordance with the present invention. By knowing about the connection as a whole, TMP can better take advantage of the available bandwidth.

A QoS message is sent alone or may be piggybacked on a data packet. It sends information regarding the connection from one end of the connection to the other. Both front-end 201 and back-end 203 send QoS messages. The information in a QoS message is the most up to date that the sending end has. That means that if a QoS message is to be resent, the QoS information is updated before it is resent. A QoS message is identified by the message type flag QoS. In a particular implementation, a QoS message contains:

16 Bits—Average round trip time (RTT). This indicates the average round trip time as calculated by this end of the system over the last time interval, measured in milliseconds.

32 Bits—Packets Sent. This indicates the number of packets that were sent in the last time interval.

32 Bits—Packets Received. This indicates the number of packets that were received in the last time interval.

32 Bits—Packets Resent. This indicates the number of packets that needed to be resent in the last time interval.

16 Bits—Window Size. This value indicates the current window size that one end is operating under. This will allow for a random sampling of window sizes to be gathered at the other end.

16 Bits—Packets in Flight. This value indicates the current number of packets that one end has sent to the other end without receiving an acknowledgement. This will allow for a random sampling of packets in flight to be gathered by the other end.

32 Bits—Time Interval. The span of time that the information in the QOS packet is dealing with. This parameter is measured in seconds.

In this manner, both front-end 201 and back-end 203 are aware of not only their own QoS metrics, but also those of the machine with which they are communicating and their shared communication link.

As suggested in FIG. 7, QoS information 708 and time synchronization information 707 can be used by blender 404 to select the order in which data is placed into TMP units 705. Also, QoS information 708 can be used by TMP units 405 and 505 to alter the TMP behavior.

In contrast with conventional TCP mechanisms, the behavior implemented by TMP unit 405 is constantly changing. Because TMP obtains bandwidth to host a variable number of TCP connections and because TMP is responsive to information about the variable status of the network, the behavior of TMP is preferably continuously variable. One of the primary functions of TMP is being able to act as a conduit for multiple TCP connections. As such, a single TMP connection cannot behave in the same manner as a single TCP connection. For example, imagine that a TMP connection is carrying 100 TCP connections. At this time, it loses one packet. TCP would require that the connection bandwidth be cut in half. This is a performance reduction on 100 connections instead of just on the one that lost the packet.

Each TCP connection that is passed through the TMP connection must get a fair share of the bandwidth, and should not be easily squeezed out by competing users of the available bandwidth. To allow this to happen, every TMP connection becomes more aggressive in claiming bandwidth as it accelerates Like TCP, the bandwidth available to a particular TMP connection is measured by its window size (i.e., the number of outstanding TCP packets that have not yet been acknowledged). Bandwidth is increased by increasing the window size, and relinquished by reducing the window size. Up to protocol specified limits, each time a packet is successfully delivered and acknowledged, the window size is increased until the window size reaches a protocol specified maximum. When a packet is dropped (e.g., no acknowledge received or a resend packet response is received), the bandwidth is decreased by backing off the window size. TMP also ensures that it becomes more and more resistant to backing off (as compared to TCP) with each new TCP connection that it hosts. Further, a TMP should not go down to a window size of less than the number of TCP connections that it is hosting.

In a particular implementation, every time a TCP connection is added to (or removed from) what is being passed through the TMP connection, the TMP connection behavior is altered. It is this adaptation that ensures successful connections using TMP. Through the use of the adaptive algorithms discussed above, TMP is able to adapt the amount of bandwidth that it uses. When a new TCP connection is added to the TMP connection, the TMP connection becomes more aggressive to accommodate it. When a TCP connection is removed from the TMP connection, the TMP connection becomes less aggressive.

TMP connection 202 provides improved performance in its environment as compared to conventional TCP channels, but it is recognized that TMP 202 resides on the Internet in the preferred implementations. Hence, TMP must live together with many protocols and share the pipe efficiently in order to allow the other transport mechanisms fair access to the shared communication bandwidth. Since TMP takes only the amount of bandwidth that is appropriate for the number of TCP connections that it is hosting (and since it monitors the connection and controls the number of packets that it puts on the line), TMP will exist cooperatively with TCP traffic. Furthermore, since TMP does a better job at connection monitoring than TCP, TMP is better suited to throughput and bandwidth management than TCP.

FIG. 8 illustrates an exemplary set of processes 808 implemented by pre-processing units 408 and 508. Some, none, or all processes illustrated in FIG. 8 may be implemented on particular packets as described hereinbefore. Unprocessed payload 801 from a payload portion of a packet are passed to processes 808 that perform encryption, compression, and/or error correction. The actual algorithms used to implement encryption, compression and/or error correction in any specific implementation are a design choice made be to meet the needs of a particular application. Error correction is preferably forward error correction that adds redundant data to the pre-processed payload so that a recipient can reconstruct the payload portion in the presence of one or more transmission errors. The amount and format of redundant information can be varied dynamically to account for current QoS conditions as reported by, for example, QoS information 708.

FIG. 9 illustrates an exemplary set of processes implemented by post-processing units 407 and 507. Some, none, or all processes illustrated in FIG. 9 may be implemented on particular packets depending on the corresponding pre-processing performed on the packets. Pre-processed packets are passed to processes that perform decryption, decompression, and/or error correction decoding. The actual algorithms used in any specific implementation are determined to complement the pre-processing processes. Error correction operates to detect one or more transmission errors, determine if the detected errors are correctable, and when correctable, reforming the corrected payload. Payload portion 903 is essentially a fully-formed payload portion of, for example, an HTTP packet.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, while devices supporting HTTP data traffic are used in the examples, the HTTP devices may be replaced or augmented to support other public and proprietary protocols and languages including FTP, NNTP, SMTP, SQL and the like. In such implementations the front-end 201 and/or back-end 203 are modified to implement the desired protocol. Moreover, front-end 201 and back-end 203 may support different protocols and languages such that the front-end 201 supports, for example, HTTP traffic with a client and the back-end supports a DBMS protocol such as SQL. Such implementations not only provide the advantages of the present invention, but also enable a client to access a rich set of network resources with minimal client software.

What is claimed is:

1. A system for redirecting a client to communicate with a remote server via an enhanced communications channel comprising:
   one or more enhanced channels configured to communicate data between a gateway and the remote server;
   the gateway configured to provide access to the remote server via at least one of the one or more enhanced channels;
   a first redirector configured to respond to the client's request directed to the remote server by redirecting the client to the gateway that provides access to the remote server via the at least one of the one or more enhanced channels; and
   a second redirector configured to receive a request from the client through a non-enhanced communications channel and to redirect the request to the first redirector.

2. The system of claim 1 further comprising one or more additional gateways, wherein the first redirector is configured to select a gateway from the plurality of gateways and to respond to the client by redirecting the client to the selected gateway.

3. The system of claim 2 wherein the first redirector is configured to select a gateway from the plurality of gateways based on a quality of service metric for at least one enhanced communications channel provided by each of the plurality of gateways.

4. The system of claim 2 wherein the first redirector is configured to select a gateway from the plurality of gateways based on a relative distance between each of the plurality of gateways and a location of the client.

5. The system of claim 1 wherein the remote server is located in a first local area network and the gateway is located within a remote second local area network.

6. The system of claim 1 wherein the non-enhanced communications channel is an Internet standard communications channel and the enhanced communications channel is not an Internet standard communications channel.

7. The system of claim 1 wherein the first redirector is configured to respond to the client by redirecting the client to a secure port address of the gateway.

8. A method for redirecting data comprising:
   receiving at a first redirector, a first request for network services through a first communication link, the network services provided by a network device;
   sending from the first redirector, a network address of a second redirector in response to the first request for the network services provided by the network device;
   selecting a second communication link from a plurality of second communication links that support communication with the network device, the second communication link provided by a gateway;
   receiving at the second redirector, a second request for the network services provided by the network device, the second request requesting the same network services provided by the network device as the first request;
   sending from the second redirector, a network address of the gateway in response to the second request for the network services; and
   providing by the network device, the network services by transferring data through the selected second communication link.

9. The method of claim 8 further comprising providing a domain name server, wherein the first request is received by the first redirector mechanism at the domain name server.

10. The method of claim 8 further comprising installing the first redirector mechanism on the network device, wherein the first request is received by the first redirector mechanism at the network device.

11. The method of claim 8 wherein the gateway is within a first local area network and the network resource is within a second local area network remote from the first local area network.

12. The method of claim 8 wherein the second communication link is selected based on a relative quality of service metric for the plurality of second communication links.

13. The method of claim 8 wherein sending the network address of the gateway in response to the second request comprises responding with a secure port address of the gateway.

* * * * *